(12) United States Patent
Phelan, Jr.

(10) Patent No.: US 7,164,131 B2
(45) Date of Patent: Jan. 16, 2007

(54) HIGH FIDELITY ELECTRICALLY CALIBRATED PYROELECTRIC RADIOMETER

(76) Inventor: Robert Joseph Phelan, Jr., 1780 Ithaca Dr., Boulder, CO (US) 80305

( * ) Notice: Subject to any disclaimer, the term of this patent is extended or adjusted under 35 U.S.C. 154(b) by 104 days.

(21) Appl. No.: 11/138,514

(22) Filed: May 26, 2005

(65) Prior Publication Data

US 2006/0266943 A1    Nov. 30, 2006

(51) Int. Cl.
*G01J 5/08* (2006.01)
(52) U.S. Cl. .............................. 250/338.3; 250/341.5; 250/352; 250/351; 374/121; 374/129
(58) Field of Classification Search ............. 250/338.3, 250/341.5, 351, 352; 374/121, 129
See application file for complete search history.

(56) References Cited

U.S. PATENT DOCUMENTS

| 3,622,245 | A | | 11/1971 | Rasmussen |
| 4,498,012 | A | | 2/1985 | Duda |
| 4,501,967 | A | * | 2/1985 | Shaulov .................. 250/338.3 |
| 5,508,546 | A | | 4/1996 | Zalameda |
| 5,574,287 | A | | 11/1996 | Kuzdrall |
| 5,860,741 | A | * | 1/1999 | Tsao et al. .................. 374/129 |
| 6,300,632 | B1 | * | 10/2001 | Liu et al. ................. 250/338.4 |
| 6,340,816 | B1 | * | 1/2002 | Micko ..................... 250/338.3 |
| 6,758,595 | B1 | * | 7/2004 | Seitz .......................... 374/137 |

FOREIGN PATENT DOCUMENTS

JP       SHO 57 35740       2/1982

OTHER PUBLICATIONS

R. W. Astheimer "Pyroelectric Laser Calorimeter," The Review of Scientific Instruments Dec. 1967, pp. 1764-1768, V 38 N12, A.I.P., New York, Ny USA.
W. R. Blevin "Influence of coatings on pyroelectric detectors," Applied Optics Oct. 1973, pp. 134 and 135, V 13 N 5, O.S.A., Washington DC USA.
G. W. Day "Effects of poling conditions on responsivity . . . pyroelectric detectors," Applied Physics Letters May 1974, pp. 456-458, A.I.P. New York NY USA.
W. J. Decosta "Laser Analysis: Accuracy . . . ," Photonics Spectra Oct. 1998, pp. 153-156 and 158, Laurin Publishing Co., Inc., Pittsfield MA USA.

(Continued)

*Primary Examiner*—Albert Gagliardi

(57) ABSTRACT

Using biased, electrical power feedback to an electrical heater, the output signal from a pyroelectric detector is made to follow the waveform of incident electromagnetic radiation. The feedback power is applied to the detector to reduce the rate of change of the detector temperature that would otherwise be caused by the absorbed radiation. The combined signals from the radiation and feedback power produce a response that follows the radiation waveform with a fast rise time and with substantially less droop than previously reported. The high fidelity of the response waveform allows for a substantial simplification of the optical chopper designs and electronics needed to implement electrical calibration. In contrast to previous electrical calibration with pyroelectrics that needed very specialized electronics, with this method a variety instruments can be used for reading pyroelectric signals. The method allows for signal processing that reduces phase noise and yields very accurate radiation power measurements.

11 Claims, 9 Drawing Sheets

OTHER PUBLICATIONS

W. M. Doyle "Implementation of . . . pyroelectric radiometry," Optical Engineering Nov./Dec. 1976, pp. 541-548, S.P.I.E., Bellingham WA USA.

J. Geist "Chopper stabilized . . . electrically calibrated pyroelectric detector," Applied Optics Nov. 1973, pp. 2532-2535, O.S.A. Washington DC USA.

C. A. Hamilton "An electrically calibrated pyroelectric radiometer system," NBS Technical Note 678 Mar. 1976 pp. 1-44, US DOC/ NBS, Washington DC USA.

F. Hengstberger "Absolute Radiometry . . . ," (book) 1989 Total pp. 266, most relevant pp. 61, 63-65, 67-68, 83, 90-107, Academic Press, San Diego CA USA.

Jin-Shown Shie "Design electrically calibrated pyroelectric radiometer," J. of Chinese Institute of Engineers 1989, pp. 249-254, V 12 N 2, China.

I. Mellouki "Study and realization..pyroelectric..energies," Meas. Sci. Technol. 2004, pp. 384-388, V15, IOP Publishing Ltd., UK.

M. Ou-Yang "Design and analysis electrically calibrated . . . thermometer," Applied Optics May 1996, pp. 2708-2715, V37 N13, O.S.A. Washington DC USA.

R. L. Peterson "Analysis of the response of pyroelectric detectors," Journal of Applied Physics Aug. 1974, pp. 3296-3303, V45 N8, A.I.P. College Park MD USA.

Robert J. Phelan, Jr. "High D* pyroelectric polyvinylfluoride detectors" Applied Physics Letters Nov. 1971, pp. 337-338, V19 N9, A.I.P. College Park, MD USA.

R. Phelan "Absolute plastic photodetector" Conf. on Precision Electromagnetic Measurements Jun. 1972, pp. 134-135, IEEE New York NY USA.

Robert J. Phelan, Jr. "Absolute .. arrays," Electro-Optical Systems Design Conference Sep. 1973, pp. 117-123, Industrial and Scientific Conf. Management, Inc., Chicago IL USA.

R. J. Phelan, Jr. "Electrically calibrated pyroelectric optical-radiation detector," Applied Optics Oct. 1973, pp. 2494-2500, V12 N10, O.S.A. Washington DC USA.

Robert J. Phelan, Jr. "The polarization of PVF and PVF2 pyroelectrics" Ferroelectrics 1974, pp. 375-377, V7, Gordon and Breach Science Publishers Ltd., Great Britain.

Robert J. Phelan, Jr. "Radiometry . . . pyroelectrics," Modern Utilization of Infrared Tech. Civilian and Military 1975, pp. 159-165, V62, S.P.I.E., Palos Verdes Estates CA USA.

M. M. Pradhan "Pyroelectric null detector for absolute radiometry," Applied Optics Dec. 1982, pp. 4456-4458, V21 N24, O.S.A. Washington D.C. USA.

M. Simhony "Pyroelectric Voltage response to step . . . ," J. of Applied Physics Sep. 1971, pp. 3741-3744, V42 N10, A.I.P., College Park MD USA.

* cited by examiner (a)

(b)

HIGH FIDELITY ELECTRICALLY CALIBRATED PYROELECTRIC RADIOMETER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—FIELD OF THE INVENTION

This invention relates to the field of radiometry. Specifically, to accurate power measurements of electromagnetic radiation over a wide range of wavelengths from the ultraviolet, through the visible, the infrared, T-rays, microwaves, and beyond to radio waves. This invention uses pyroelectric detectors to measure this wide range of radiation wavelengths.

BACKGROUND OF THE INVENTION—THE PYROELECTRIC DETECTOR RESPONSE

The pyroelectric detector is classified as a thermal detector. Electromagnetic radiation incident on the detector is absorbed. The absorbed radiation heats the detector, and a signal current is generated that is proportional to the time rate of change of the temperature of the pyroelectric. No other source of power is required to produce a signal. The detector current creates a voltage across a shunting resistor. The observed wave shape for the voltage response to incident radiation power will depend on details of the detector's construction, its environment, the attached electronic circuit, and the time scale involved in the observation. With the common signal amplifying electronics designed for high the signal to noise ratio, the observed waveform is typically distorted from the waveform of the incident radiation power. The pyroelectric response waveform does not typically reproduce the radiation waveform.

To see how the pyroelectric response can differ from input radiation power, one can observe the response to a step in input radiation. A step in input radiation corresponds to radiation that starts at one level and then rapidly changes to a second, fixed level of radiation where it is held constant. A radiation waveform is shown in FIG. 1(a) and a corresponding voltage response is shown in FIG. 1(b). For FIG. 1(a) it is assumed that, before the sudden increase in radiation, the power was constant and the response voltage was at a constant, zero value. The displayed detector response does not follow the radiation waveform. The output voltage of the detector starting at one level rises to a peak value and then droops back to the original level. Although the radiation continues to be applied to the detector, the response to the step in input radiation has disappeared.

A mathematical expression that works for many practical cases and explains the waveform displayed in FIG. 1(b) is given by the following equation for the voltage V(t) as a function of time.

$$V(t) = (P\alpha/(C_E C_T))(e^{-(t/\tau_E)} - e^{-(t/\tau_T)})/((1/\tau_T) - (1/\tau_E)), \quad (1)$$

In equation (1), P is the amplitude of the step in radiation power, $\alpha$ is a factor fixed by the detector structure and materials, $C_E$ is the electronic capacitance of the pyroelectric detector, and $C_T$ is the detector heat capacity. e is the symbol for the value of the base of natural logarithms, $\tau_T$ is a thermal time constant and $\tau_E$ is an electrical time constant. The electrical time constant is the product of the detector electronic capacitance and the electrical load resistance connected across the detector. The thermal time constant is the product of the detector heat capacity and its thermal resistance to a heat sink. The results displayed in FIG. 1 are for a detector and circuit with thermal and electrical time constants both near to a value of 1 second. These time constants are values that can be obtained with practical detectors. The horizontal time scale is 2 seconds per horizontal division. In FIG. 1 the voltage range of the vertical scale is not specified. The voltages can range over many orders of magnitude corresponding to different orders of magnitude in radiation power. The shape of the waveform can be practically independent of the amplitude for the step in radiation power.

FIG. 2(a) displays a radiation waveform that is turned on; held at a constant level, and then after 10 seconds turned off. This waveform is equivalent to two step functions of equal absolute magnitude but of opposite sign, one positive and one negative. Such a waveform can be produced by removing a shutter from a position in front of a steady radiation beam that is directed toward the detector, and then, after a delay, returning the shutter into the position blocking the beam. Without a shutter, the electrical power to an electrically powered radiation emitter directed toward the detector may be turned on to a fixed level and then turned back off.

FIG. 2(b) displays a resulting pyroelectric detector response for the waveform of FIG. 2(a). As in FIG. 1(b), the response reaches a peak value and then decays down close to zero. Subsequently, when the radiation is turned off, the response goes below the original value, reaches a minimum value and again returns to the original value.

In FIG. 1 and FIG. 2, as a result of the radiation level changing, there was a response signal. With no change in power level, there is no response signal. If the radiation is constant and not changing, the signal will disappear. Because of the response behavior just described, it is often stated that pyroelectric detectors can detect pulsed and modulated radiation, but they are not CW, continuous wave, detectors. This contrasts with bolometer and thermocouple detectors, which can exhibit an output for a constant level of radiation.

For the waveforms presented in FIG. 1 and FIG. 2, the shape of the response voltages are quite distorted from the shape of the radiation waveform. In spite of the distorted waveform, energy and power measurement instruments have been made that employ such waveforms. To measure the energy in pulses of radiation the peak or integral of the area of the waveform has been used. To measure continuous radiation, instruments have made that employed radiation choppers produce an ac signal from the pyroelectric. The ac signal has been rectified to produce an output proportional to the radiation power. These instruments are calibrated by applying radiation sources of known energy and power.

For some time intervals, the response of pyroelectric detectors has been made to follow the radiation signal with greater fidelity by simply changing the electrical time constant. The rise time of the response is limited by the detector capacitance and the load resistance. By shunting the pyroelectric detector with a resistor with a lower value the rise time can be shortened. However, lower load resistor values can lead to a reduction in the signal to noise ratio and a more rapid droop in the response. The response time can be extended by using a larger valued load resistor, but this will degrade the rise time.

The transimpedance amplifier has been used to reduce the rise time compared to that obtained with a voltage mode amplifier. FIG. 3a repeats the radiation waveform of FIG. 2a, but displays the response FIG. 3b of a pyroelectric detector that is using a transimpedance amplifier. The feedback resistor of the transimpedance amplifier was chosen to equal the value of the load resistor used to produce the responses of FIG. 1 and FIG. 2. The response shown in FIG. 3b exhibits a much shorter rise time. The electrical time constant has been effectively decreased without reducing the value of the resistor that determines the system noise. The transimpedance amplifier can effectively shorten the electrical time constant without significantly degrading the signal to noise ratio, but the amount of droop is increased.

There have been several published reports of efforts to extend the frequency response of pyroelectric detectors beyond what can be accomplished by simply changing the load resistance. Lower frequency responses have been obtained by combining the pyroelectric response with other response mechanisms such as bolometer and piezoelectric. Radiation feedback has been use to extend the high frequency response over the response improvement obtained with a transimpedance amplifier. These methods have substantially complicated the required electronic circuitry and the detector structure. These methods have required an application of radiation power with a known value to calibrate the detector response. Drifts in the response between calibrations remained as a problem for users requiring accurate measurements.

BACKGROUND OF THE INVENTION—THE ELECTRICALLY CALIBRATED PYROELECTRIC RADIOMETER

Phelan (1972) proposed an electrical calibration method for measuring radiation with a pyroelectric. The method required an electrical heater be constructed on the detector. This was a significant detector modification in that it required an extra electrical lead be added to the detector. The method used a radiation chopper. The chopper, besides blocking and passing the radiation at a precise frequency, was used to generate an electrical pulse with a waveform close to that of the radiation waveform. As previously discussed, the response signals to the radiation and electrical powers were typically quite distorted, however, for identical electrical and radiation power waveforms the two response waveforms, although distorted, were identical. To obtain a calibration, a response to the electrical power applied to the heater was compared to the response to radiation absorbed. It was important that the applied waveforms for the radiation and for the electrical power be identical. One way that was used to measure the response was to use the integrated output of a synchronously locked, phase sensitive amplifier. Using square shaped waveforms for the radiation and the electrical power, the electrical power was adjusted to give the same response voltage as that caused by the radiation. With equal responses, reading the electrical power yields the absorbed radiation power. Instruments were developed that subtracted the response to electrical power from the response to the radiation power. If the two powers are equal, the subtraction leads to a zero or nulled output. The equivalent electrical power was continuously updated and displayed. An automatic nulling of the response shortened the time between electrical and radiation measurements and eliminated the need for temperature compensation of the pyroelectric response. The complete measurement instrument was referred to as an electrically calibrated pyroelectric radiometer and abbreviated as ECPR. The ECPR was a self calibrated radiometer in that it did not require a radiation standard for calibration.

The method of calibration by electrical substitution is accepted as the most accurate way to measure radiation power. However to assure an accurate calibration with the ECPR there were many adjustments that had to be precisely set. The ECPR required a constant speed, large diameter chopper with a small aperture for positioning the radiation beam. The ECPR required a substantial amount of dedicated circuitry to give accurate measurements. This system could only be used to determine relatively slow variations in radiation power. The design and limitations of the ECPR are well documented in publications available to the general public and in instrument manuals.

BACKGROUND OF THE INVENTION—OTHER ELECTRICALLY CALIBRATED RADIOMETERS

Other names given for electrically calibrated radiation measurement instruments are absolute radiometers, active cavity radiometers, isoperibol calorimeters, and electrical substitution radiometers. Hengstberger (1989) edited a book titled "Absolute Radiometry" that gives a thorough review of the application of the electrical substitution method for a wide range of radiation detectors. This book relates the details of using electrical substitution with bolometer and thermocouple detectors. This book also includes several references to and comparisons of the ECPR to other radiometers. There are discussions on the use electrical feedback to speed up the response of dc type thermal detectors by using electrical feedback circuits to maintain the detector at a constant temperature. The power in the feedback circuits is typically made proportional to the signal voltage. The process of making the feedback power proportional to the signal power is done to linearize the feedback loop. The linearization can simplify some methods used for mathematical analysis of how the feedback system behaves, but the linearization can substantially increase the required number of components and substantially complicate the system design.

BACKGROUND OF THE INVENTION—THE USE OF MULTIPLE DETECTORS

As previously noted, the electrical calibration yields the radiation power absorbed by the detector. An ideal detector would absorb all the incident radiation and thus exhibit no reflection. With no reflection, the electrical power can be equated to the incident power. Various black coatings for detectors have been developed in attempts to approach this ideal condition. However, for many detector systems there are practical reasons for not using these blacks. The black coatings typically work at some radiation wavelengths and not at others. The black, by adding to the heat capacity, can degrade the detector response. The black coating may be too fragile. If the detector does not incorporate a sufficiently good black absorber, and there is reflected radiation, this reflection must be accounted for if one is to make an accurate measurement.

Rasmussen (1971) described a method using a pair of thermal, electrically calibrated detectors to determine the reflectance. To apply this method the detectors must exhibit a uniform response over the detector surface. This uniformity is difficult to obtain with many types of detectors. The method required knowledge of the polarization state of the radiation. Although Rasmussen stated that the calorimeter used had a faster response time than prior art devices, the response times presented were orders of magnitude slower than the speeds obtained with pyroelectrics.

Duda (1985) described the use of several silicon semiconductor photodiode detectors to form a light trap structure to collect essentially all the radiation. Radiation reflected off each diode was directed onto other diodes until a negligible amount was left. If the radiation is monochromatic, if one knows wavelength, and if the photodiodes yields one electron-hole pair for each absorbed photon, the power can be calculated from sum of the currents of the photodiodes. For the photodiode trap to yield an accurate result, the photodiodes must exhibit an internal quantum efficiency close to unity. Radiation loss by specular reflection had to be the dominant reason for the incident radiation not generating an electron-hole pair for each incident photon. If the only reason for a deviation from a uniform response is a variation in reflectance, the trap structure can yield a more uniform response than obtained by a single detector. Silicon photodiodes cover a limited spectral range and typically do not yield accurate measurements for radiation power levels above a milliwatt. To extend the wavelength range and power levels, there have been attempts to use other semiconductors for the traps. However, it has been difficult to form traps that yield accurate results with photodiodes made with semiconductors other than silicon. With all semiconductor photodiode traps, the wavelength of the radiation must be accurately known or measured for an accurate determination of the power. This fact can substantially increase the effort required for measuring the radiation power.

BACKGROUND OF THE INVENTION—COMPENSATING FOR BACKGROUND TEMPERATURE CHANGES

Remote temperature measurements of objects are performed by measuring their radiated power. The net power input to the radiation detector is the difference between the incident power and the power emitted by the detector. The difference in powers is related to the difference in temperatures. If not controlled, the detector's temperature and adjacent components will change with the ambient temperature. It is common for temperature measuring radiometers to employ one or more reference temperature measurement devices strategically located to compensate for changes in net received power due to changes in the ambient temperature. Alternatively radiometers have been made with their heat sink or surroundings or both maintained at a precise temperature to control the background radiation and eliminate drift. This is done to improve the accuracy for temperature and radiant power measurements. If the temperature to be measured is high enough, the net input radiation will not be significantly affected by the background changes, and the reference temperature and temperature control is not needed. If the radiation beam is well collimated, the influence of background radiation drift may be made insignificant by using apertures, and a shutter or chopper.

BACKGROUND OF THE INVENTION—OBJECTS AND ADVANTAGES

Electromagnetic radiation power measurements are required for a large number of technical fields. Some of the fields involve the development of solar power, optical communications, optical reading and writing of data, optical displays, remote sensing of the environment, remote temperature measurements, imaging by using scanning beams, radiation losses from buildings, general lighting, laser machining, medical laser surgery, and optical lithography. The radiation power measurements are necessary for the design, maintenance and operation of systems used in these fields. There are many specialized instruments that have been developed for each of these fields to measure the radiation for specific ranges of wavelengths and power levels. Some make rapid measurements and some are very slow. Most have to be calibrated using a radiation source of predetermined power. It is reasonable that a low cost, self-calibrated instrument that could be used to solve many of the measurement needs for the wide range of technical fields and applications would experience a large demand.

It is the object of this invention to provide a method for measuring radiation power, which requires no standard radiation source for calibration, and will allow for accurate measurements over an extremely broad range of radiation power levels, wavelengths, and modulation frequencies. The method allows for substantial simplification of the dedicated electronics over prior art and allows one to choose from many more alternatives for the readout electronics. In contrast to previous pyroelectric detectors, the method of this patent produces a high fidelity output that is a very close reproduction of the radiation input power for pulse lengths that are exceedingly longer than previously reported. Two substantial improvements are obtained: the system rise time is shortened and the droop is substantially reduced. Pulse shapes are faithfully reproduced. It is the accurate waveforms that result from the new method that expand the utility of pyroelectric detectors. In contrast to prior art, the signal response is not dependent on the pyroelectric material used, but is fixed by stable electronic circuit components. The Method will significantly expand the use of an electrically calibrated pyroelectric radiometer. The method can be applied to create standards and practical measurement instruments for the measurement of radiation for many fields of radiometry covering wavelengths from the ultraviolet to radio waves.

SUMMARY OF THE INVENTION

The method and systems of this invention allow the response of a pyroelectric detector to follow an incident radiation waveform with high fidelity. The method uses a biased, direct, broad band feedback circuit to apply electrical power to an electrical heater in intimate contact with the detector. The method and apparatus described allow for accurate electrical calibration with substantial electronic circuit simplification over prior art.

DRAWINGS—FIGURES

DETAILED DESCRIPTION—BASIC OPERATION

Figure 1:
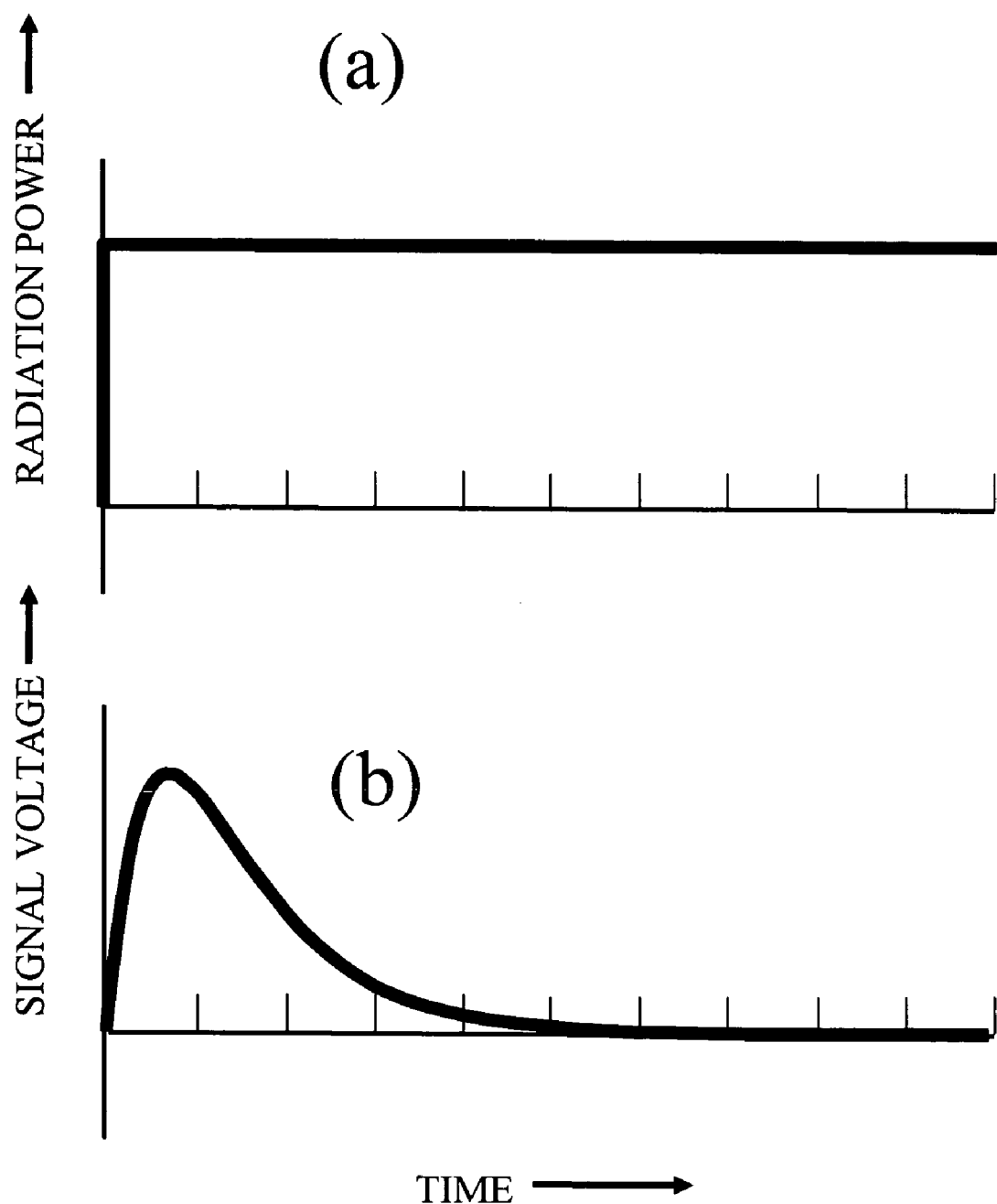
FIG. 1 shows a step of radiation applied to a pyroelectric detector and a resulting pyroelectric detector voltage response.
Figure 2:
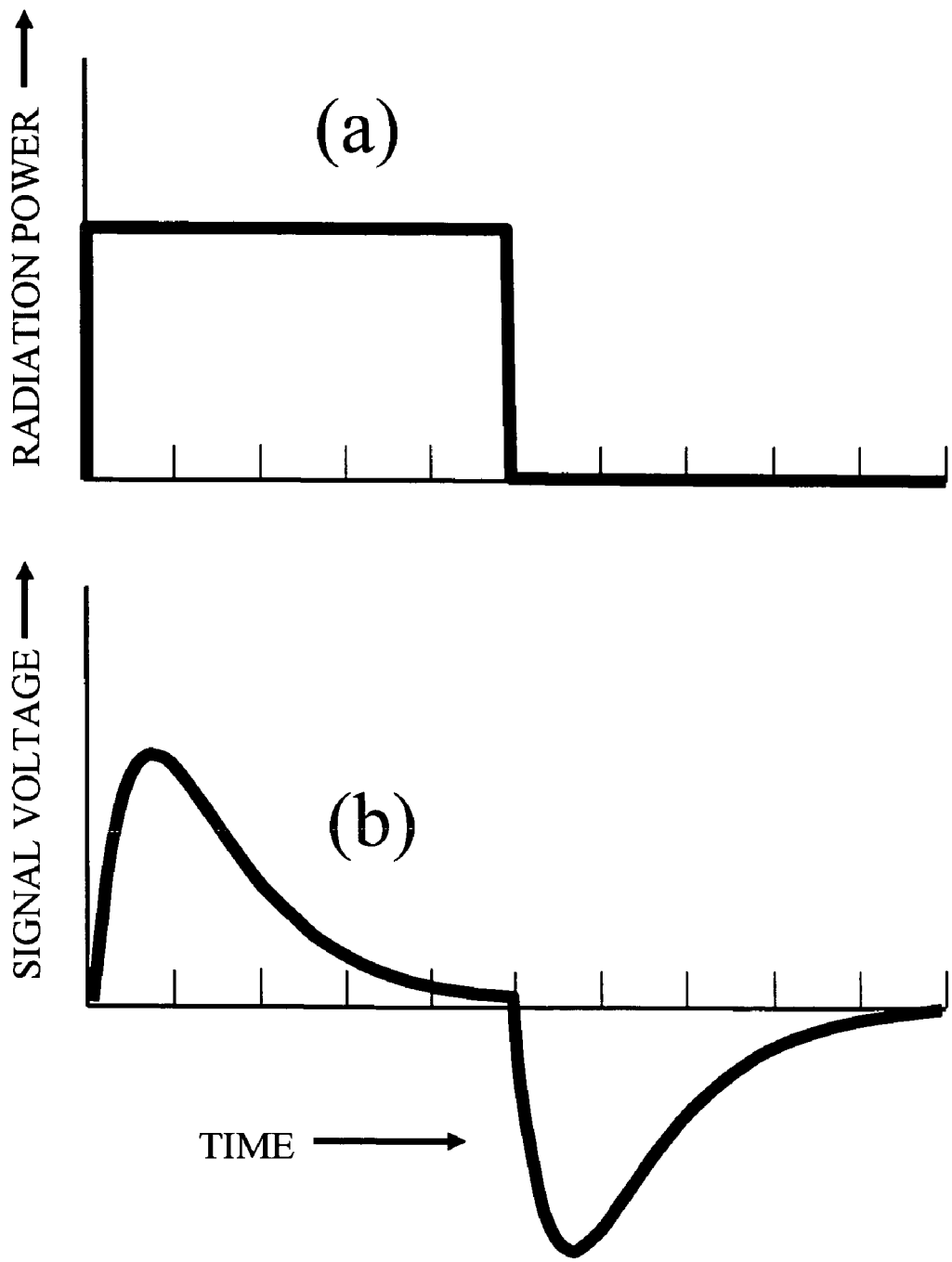
FIG. 2 shows a rectangular pulse of applied radiation waveform and a resulting pyroelectric detector voltage response.
Figure 3:
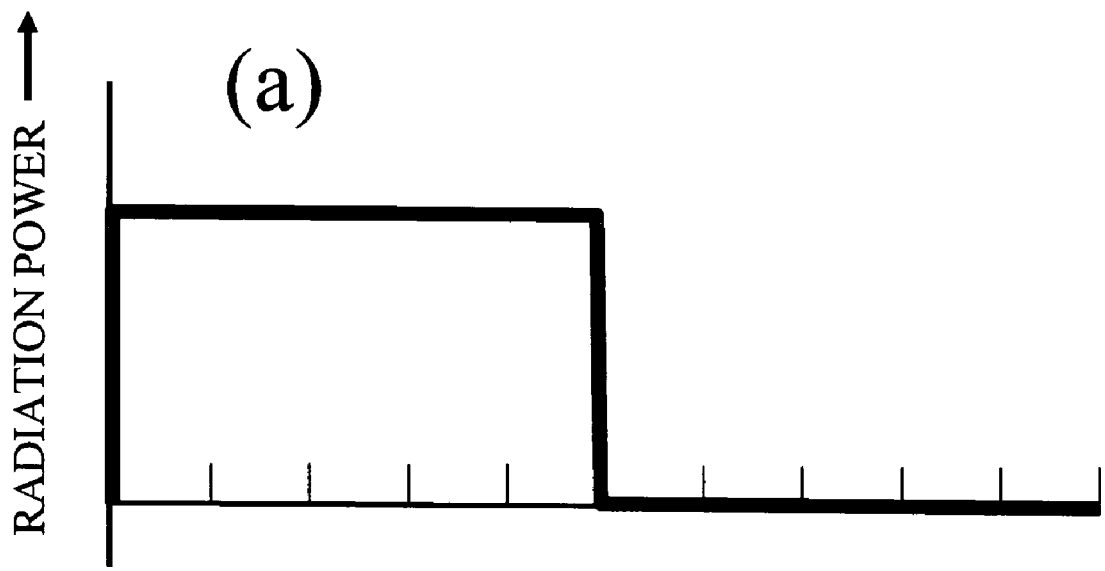
FIG. 3 shows a rectangular pulse of applied radiation waveform and a resulting pyroelectric detector voltage response using a transimpedance amplifier.
Figure 3:
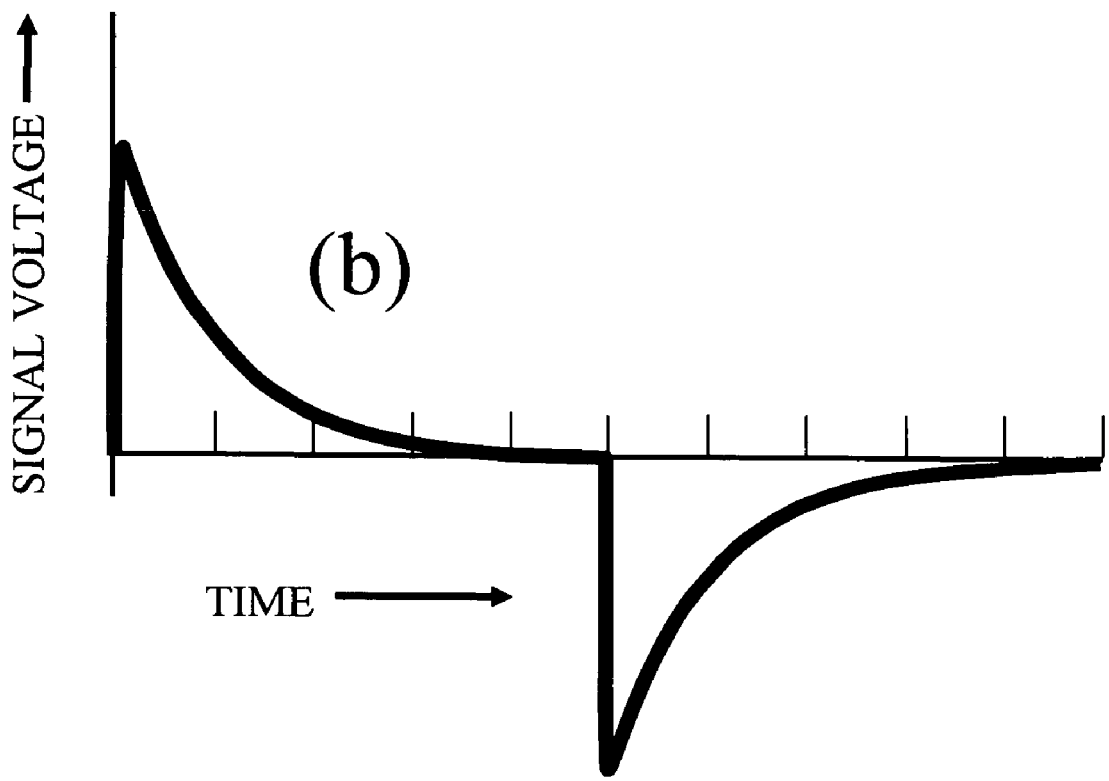

For the present embodiment of an electrically calibrated pyroelectric radiometer, the waveform for the electrical calibration power is derived directly from the pyroelectric detector signal generated by the incident radiation waveform. This mode of operation leads to improved signal fidelity, and an accurate electrical calibration. This mode of operation is substantially different than previous electrically calibrated pyroelectrics which used a signal generated and conditioned from a separate detector to provide the electrical power.

To obtain an improved signal, a biased, electrical power feedback circuit is used. A bias electrical power is applied to a detector heater, and this elevates the pyroelectric temperature above a reference temperature. The reference temperature is the temperature of a heat-sink structure to which the pyroelectric is in thermal contact. When a radiation signal is incident on the detector, the detector temperature rises, and this produces a signal from the detector. This signal is amplified by a broad band electrical circuit and used to modify the power applied to the electrical heater. The sign and phase of the feedback signal are controlled such that when radiation power incident on the detector is increased or decreased, the electrical power is respectively decreased or increased to the heater in a manner to reduce the rate of change of the detector temperature. This direct electrical power feedback can very substantially reduce the time to respond to a step input of radiation, and the response waveform can be extended to follow the input radiation waveform for times far exceeding the time intervals obtained without this bias and feedback. The improved rise time and reduction of droop substantially reduces distortion in the response waveform.

This reduction in the rate of change of temperature contrasts with the prior art feedback method, used with bolometers and thermocouples, that was designed to hold the detector temperature constant. Since bolometers and thermocouples exhibit a response to continuous radiation, the feedback applied to bolometers and thermocouples was not used to extend the time for response or to reduce droop.

As the gain of the electrical feedback circuit is increased, the feedback power approaches the radiation power. The feedback of power is a self limiting process in that it approaches, but does not exceed, the value of the radiation power. As this limit is approached, the response waveform can reproduce the radiation waveform with higher fidelity. The radiation power can be determined by measuring the change in electrical power applied to the detector heater in response to the incident radiation. If the gain was infinite, the absorbed radiation and electrical powers would be identical.

For practical circuits, which have less than infinite gain, there will be a difference between the two powers. With sufficiently large gain the difference can be negligible. If the difference is not negligible, a correction factor may be determined and used to improve the accuracy of the results. A radiometer system that incorporates this method of producing a high fidelity response from a pyroelectric will be abbreviated as a HiFi ECPR.

Figure 4:
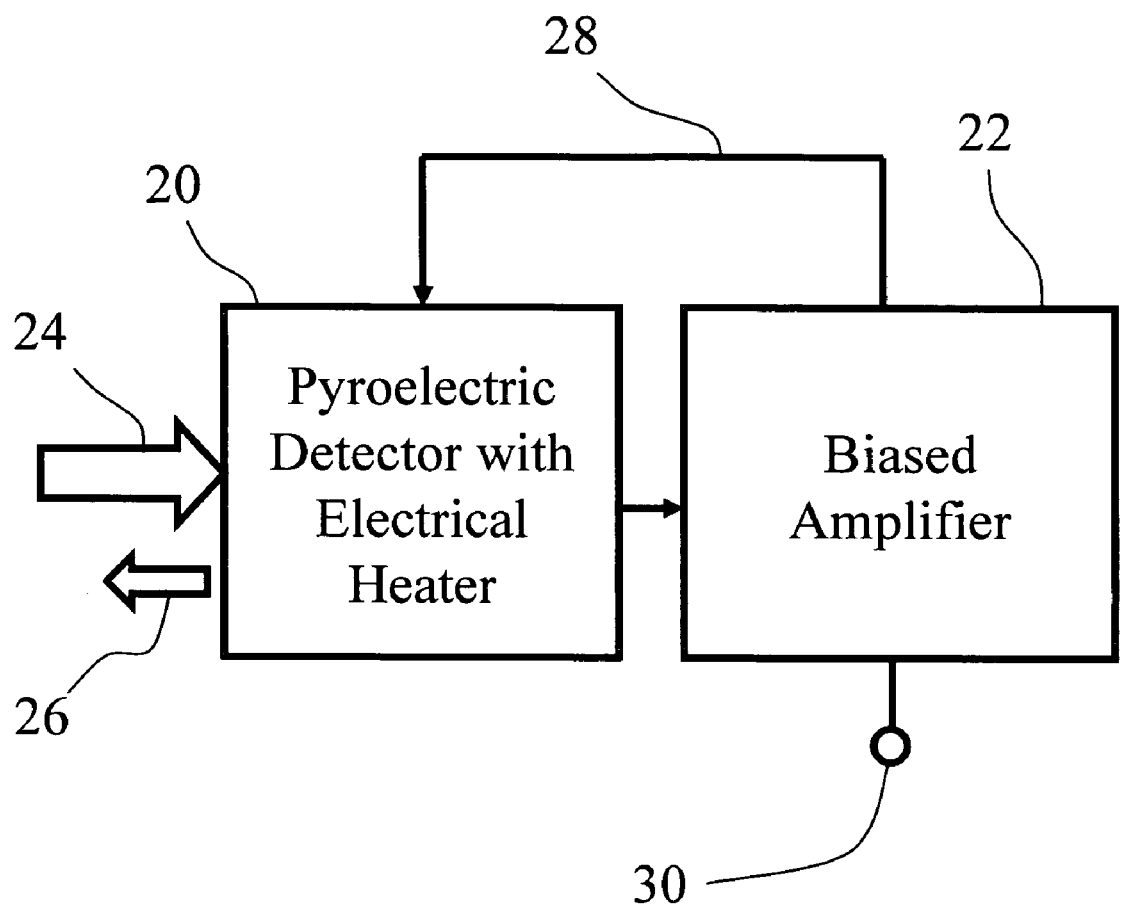
FIG. 4 shows a block diagram of a pyroelectric detector with biased electrical power feedback.

FIG. 4 shows a block diagram of elements to implement a HiFi ECPR. The pyroelectric detector 20 has an electrical heater incorporated into its structure to allow for the application of electrical power in addition to radiation power. Block 22 represents an electronic circuit that provides a bias power that is combined with the pyroelectric response to produce a signal to reduce the rate of change of the temperature of the detector due to incident radiation. The incident radiation is indicated by the arrow 24. Arrow 26 signifies reflected radiation. Assuming no transmitted radiation, the net absorbed radiation is the difference between 24 and 26. If there is significant transmitted radiation, it too must be measured to determine the fraction of incident radiation absorbed. The amplified signal and bias are applied directly to the electrical heater indicated by the path 28. An output port 30 that may be a single terminal or multiple terminals is present to measure voltages from which the feedback power applied to the detector heater can be determined. There are many possible designs for the electronics for block 22. An important feature for the electronics is that they provide sufficient amplified power at the proper frequencies and phases to significantly reduce the rate of change of the temperature of the detector over the rate of change that would occur without the electrical power feedback. In contrast to the prior art ECPR, which required several additional specially designed components to make a useful system, the simple diagram of FIG. 4 can be used with many general purpose instruments to make a complete radiometer.

Prior art applications of feed back that were used to hold the temperature constant for bolometers and thermocouples typically included circuitry to linearize the circuit feedback equations. For example, since the power applied to the detector heater is proportional to the square of the applied voltage, circuitry may be used to take the square root of a voltage before it is applied to the heater.

For the HiFi ECPR the detector temperature is not held constant, but the power applied to reduce the rate of change of temperature can be linearized. This linearization can be used to simplify the mathematics that describes the response. If block 22 in FIG. 4 contains linearization circuitry, the detector response voltage with feedback can be shown to obey the form of equation (2).

$$V(t) = (P\alpha/(C_E C_T))(e^{-(t/\tau_2)} - e^{-(t/\tau_1)})/((1/\tau_1) - (1/\tau_2)), \quad (2)$$

Equation (2) looks identical to equation (1) except for the $\tau$ subscripts. The $\tau_T$ and $\tau_E$ which appeared in equation (1) have been replaced by $\tau_1$ and $\tau_2$ respectively to form equation (2). The relationship between the $\tau$'s is that the product of $\tau_1$ times $\tau_2$ is equal to the product of $\tau_T$ and $\tau_E$. As an example, for the specific case with $\tau_T$ and $\tau_E$ both equal to one second the product will be one second squared. The product of $\tau_1$ and $\tau_2$ will also be one second squared, but with sufficient power feedback the value of $\tau_1$ can be $1/100$ second with a value for $\tau_2$ of 100 seconds. With this example, the rise time is reduced by a factor of 100 and the droop reduced by a factor of 100. With these changes, the response waveform will be substantially improved. The response waveform can closely reproduce the radiation waveform. The improvement is not limited to factors of 100. The factors are determined by the gain of the power feedback circuit. The upper limit to the factors is typically determined by power amplifier bandwidth, limitations of practical circuits and the detector construction details. As the feedback gain is increased, the system can become unstable and exhibit oscillatory behavior which makes the circuits inoperable. This unstable region of operation is to be avoided by careful circuit and detector design and by limiting the feedback power at the frequencies that can cause unstable operation. Proper circuit design can be assured through an analysis of the phase and amplitude of the circuit voltages. The detector is constructed so that the heat flow from the electrical heater is equivalent to the heat flow from the absorbed radiation.

Equation (2) was derived for the case of linear feedback. It is also a good approximation for the response without linearizing circuits in the feedback when the radiation power level is small compared to the power bias level.

The solution for the response for a linear system was presented to provide a relatively simple formula to explain the response behavior. A computer analysis that allows for nonlinear feedback shows the linear feedback is not necessary. A substantially shortened the rise time, reduced droop, and stable operation can still be obtained with a nonlinear feedback. When the radiation power becomes comparable to the bias power, it becomes important that the output be determined by calculating the change in power applied to the detector heater for the change in radiation power. The voltage output from the amplifier may become nonlinear, but the power applied to the heater remains substantially linear with respect to the input radiation level. In other words, in contrast to prior art, it is not necessary to incorporate the square root function or other linearization function in the feedback to obtain the improved response power waveform and an electrically calibrated measurement.

Figure 5:
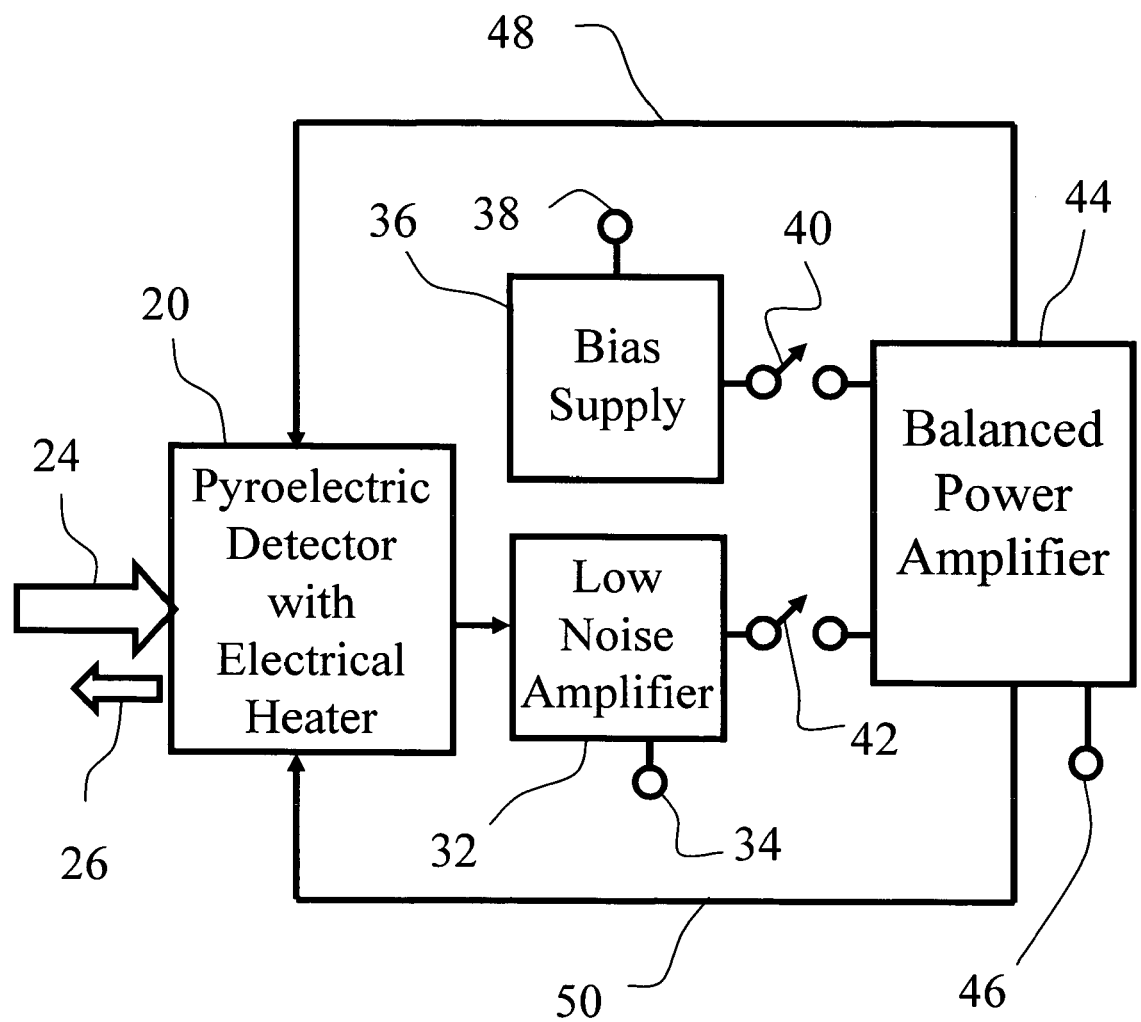
FIG. 5 shows a block diagram of a pyroelectric detector with biased electrical power feedback with amplifier and bias separated from power amplifier.
Figure 6:
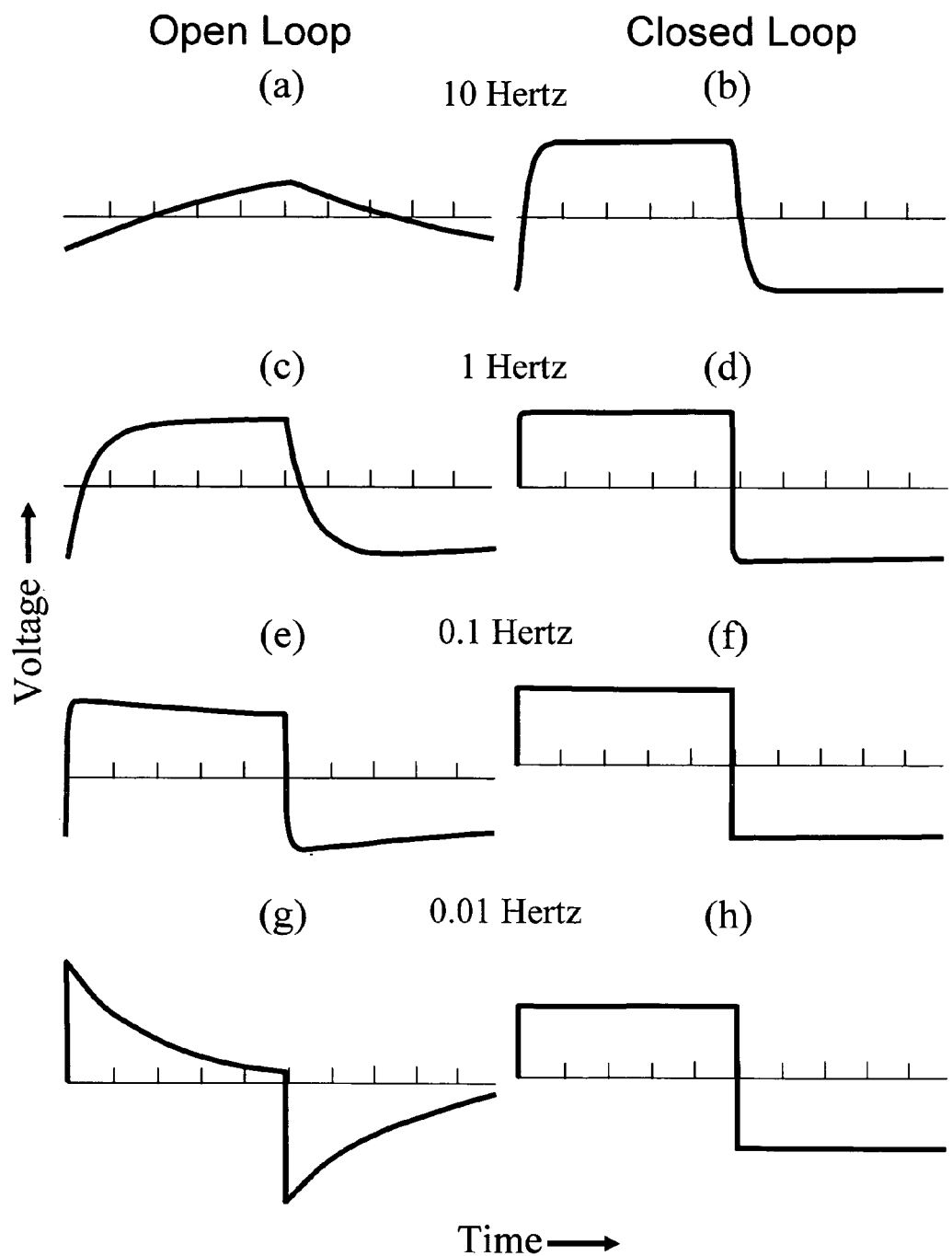
FIG. 6 shows measured waveforms obtained from the circuit shown in FIG. 5.

One approach to the design of FIG. 4 is to separate the circuitry into the blocks depicted in FIG. 5. In FIG. 5 the bias 36, low noise amplifier 32, and the circuit that adds the bias to the signal in a power amplifier 44 are separate and distinct elements of the circuit. FIG. 6 shows distinct output terminals 34, 38 and 46 that make up the output port. The output at 34 yields the signal voltage without the bias; output 38 yield the bias voltage, and the output 46 contains the addition of the bias and signal voltages. These voltages are used to determine the electrical power applied to the detector heater. The electrical power applied to the heater is the product of the voltage and current applied to the heater. The change in the applied electrical power corresponds to the change in the applied radiation power.

Two additional components are presented in FIG. 5. Bias switch 40 allows for the system to operate with or without the bias. Added switch 42 allows the system to operate with or without feedback power. These switches are not necessary for the basic operation but can improve the utility of the system. If the feedback is applied before the bias, there can be a substantial delay time before the system is operational. With switch 42 open the bias can be applied without feedback. The detector temperature will rise to a new level. Once the rate of change of temperature is sufficiently small, switch 42 can be closed to apply the feed back power. Performing this startup sequence shortens the time to achieve operability. This sequencing of switch closures may be done manually or automated.

FIG. 5 shows the power amplifier 44 to be a balanced power amplifier. The balanced power amplifier applies equal positive and negative voltages, relative to the amplifier input, along lines 48 and 50 to the detector heater in response to input radiation. Using the balanced power feedback reduces the error due to capacitively coupled currents that are added to the pyroelectric currents.

A circuit with the elements depicted in FIG. 5 was used with a pyroelectric detector that incorporated an electrical heater. For this demonstration the low noise preamplifier was configured as a broadband, transimpedance amplifier with a $10^{10}$ ohm feedback resistor. The pyroelectric detector was designed to exhibit a broadband current responsivity. The detector capacitance was $2 \times 10^{-10}$ Farad. The response signals for several radiation waveforms were recorded with an oscilloscope. The radiation waveforms were produced by a light emitting diode that was turned on and off to produce square waves at four frequencies. The rise and fall times for the radiation were sufficiently short that the measurements presented display the detector circuit response. The droop of the radiation waveform was also negligible. The recorded oscilloscope traces are displayed in FIG. 6. Switch 40 was closed for all of these measurements. The response waveforms in the left column, open loop, were obtained with switch 42 open. The response waveforms in the right column, closed loop, were obtained with switch 42 closed. The frequencies for the radiation waveforms were 10, 1, 0.1 and 0.01 Hz and are listed in FIG. 7 next to the corresponding response waveforms.

The data presented in FIG. 6 clearly shows the effect of applying electrical power feed back to the pyroelectric detector. If there was no distortion of the waveforms, with the time scales presented, the waveforms would be precise square waves with imperceptible rise and fall times and no droop. In the left column the waveforms are significantly distorted. In the right column the waveforms are close representations of the applied radiation power. FIG. 6(a), without the feedback, shows substantial lengthening of the rise and fall times. FIG. 6(b), with feedback, exhibits a much shorter rise and fall time. The dominant factor limiting the rise time for FIG. 6(b) is due to a $5 \times 10^{12}$ Farad capacitance shunting the $10^{10}$ ohm feedback resistor that limited the high frequency gain. This capacitance was added to the circuit to improve the system stability. For the other figures in the right hand column the waveforms are indistinguishable from the radiation waveform. The droops in the waveforms on the left are eliminated on the right. The feedback produces a response waveform that replicates the radiation waveform with high fidelity.

Figure 7:
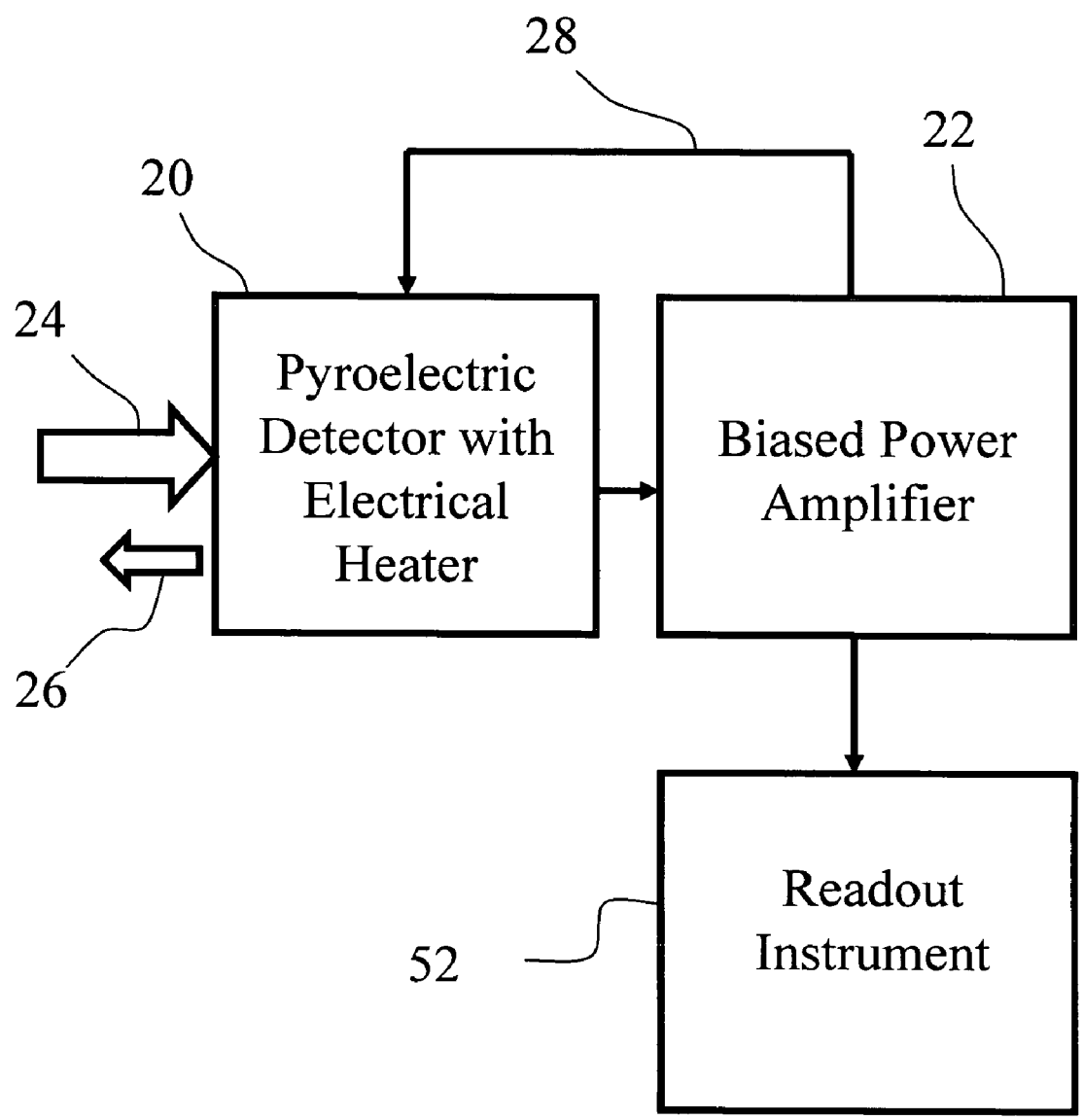
FIG. 7 shows a block diagram of a pyroelectric detector with biased electrical power feedback and a readout device to complete a power measurement system.
Figure 8:
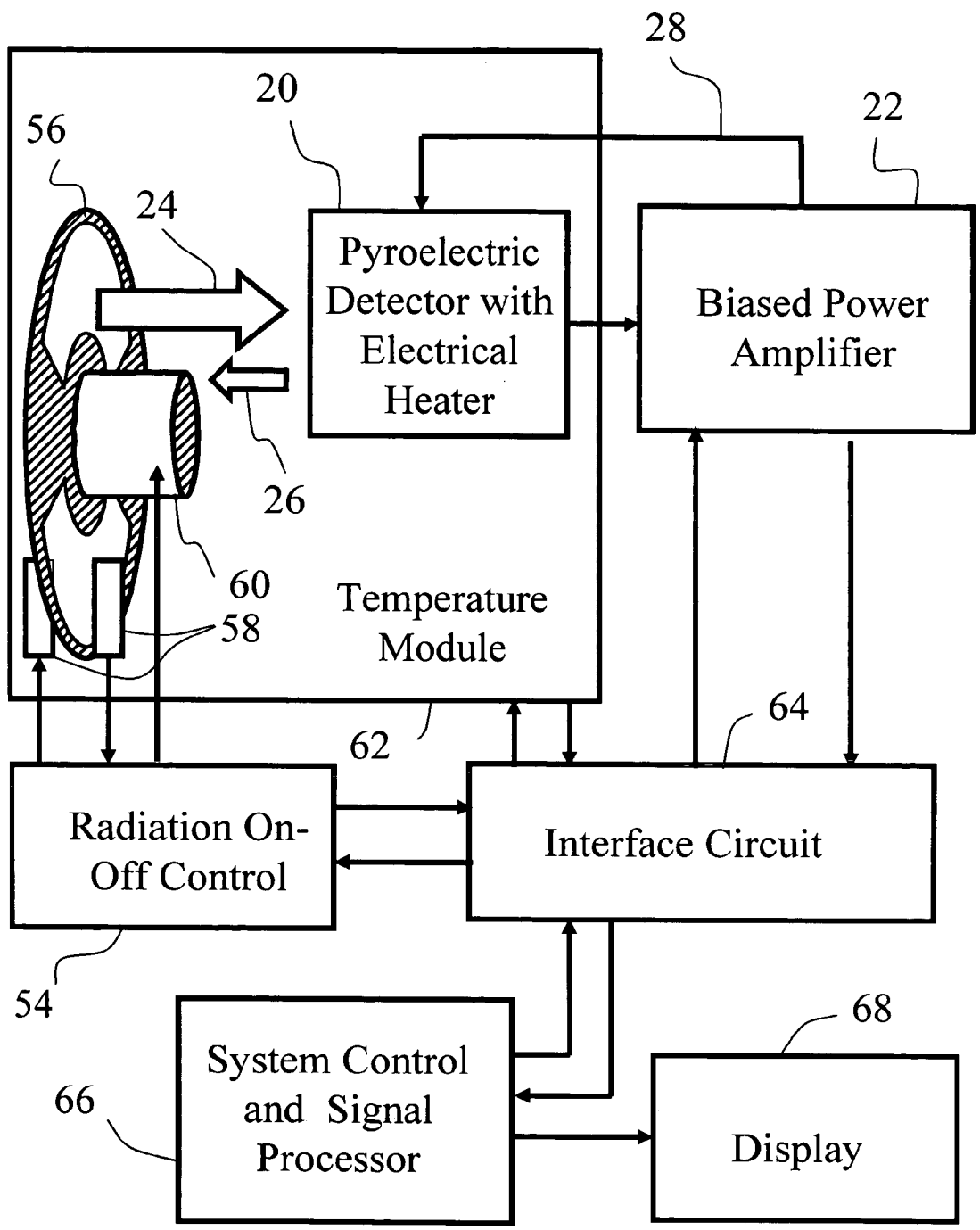
FIG. 8 shows a block diagram of a high fidelity electrically calibrated pyroelectric radiometer that contains several components so it can be used for a wide range of applications.

To complete a measurement system, the circuits depicted in FIG. 4 and FIG. 5 need a display to present the power. FIG. 7 shows a block diagram of a display added to FIG. 4. For the data presented in FIG. 6 the display was an oscilloscope. The display can be a meter that displays the feedback power. Several additional components may be added to the system to make it useful for a wide range of applications. Many of the additional components are shown in FIG. 8. FIG. 8 shows a rotating chopper blade 56 driven by a motor 60. The blade is used to chop continuous radiation into an on and off square wave. To obtain the data presented in FIG. 6, the light source itself was turned on and off. For many practical applications the source cannot be turned on and off, and the chopper blade provides this function. Although a rotating chopper is shown, a sliding shutter or other alternative mechanisms can be used to modulate a continuous beam of radiation. Shown in FIG. 8 is a radiation on-off control box 54 to provide power for the chopper. As the speed of the chopper is increased, it becomes necessary to sense the position of the chopper to know when the blade is passing radiation and when it is not. FIG. 8 shows a sensor 58 that can be used to determine the position of the chopper. For low chopping frequencies, 60 can be a programmable motor that can be simply positioned by signals from the system control.

In contrast to the prior art it is not necessary to precisely control the duty cycle, the phase and the frequency of the chopper to obtain an accurate power measurement. With the HiFi ECPR the measured power levels, for a fully open and a fully closed chopper or shutter, when compared to prior art are substantially independent of the speed of the chopper or shutter. The portions of the waveform, which correspond to the transition regions between on and off radiation powers, can be simply ignored when processing the signal response. These facts relax the design requirements for an optical shutter or chopper. The influence of jitter in the timing of the shutter or chopper is substantially reduced. Chopper phase noise can be reduced to negligible levels. These facts allow for the utilization of a greater variety of shutters and choppers that are also less expensive, are smaller, and consume less power.

It was noted that in the prior art, to make temperature measurements the detector temperature is sometimes measured. FIG. 8 shows a temperature module 62. This may include only a sensor that determines the detector temperature. To reduce the influence of background radiation, to enhance the signal to noise ratio and to allow for even more accurate temperature measurements, the temperature module may be a complete, controlled temperature environment.

FIG. 8 shows an interface circuit 64 between the chopper, the power amplifier, the temperature module and the system control and signal processor 66. One example for the system control and signal processor is a general purpose computer. There are many ways to interface with the many ports of general purpose computers. An example of an interface is a general purpose analogue to digital and digital to analogue board connected to the computer through a universal serial bus. Element 66 may be a general purpose lock-in amplifier or synchronous detector. Alternatively, elements 66 and 64 can be specifically designed components for a specific application. These elements may be specifically designed for minimum size, maximum speed, or minimum power consumption.

An example of element 68 is a computer display screen. Alternatively this display may be a special purpose device that is designed to accommodate a specific application. Not all the elements shown in FIG. 8 are required for a useful system, and there are many alternative designs for each of the elements.

Figure 9:
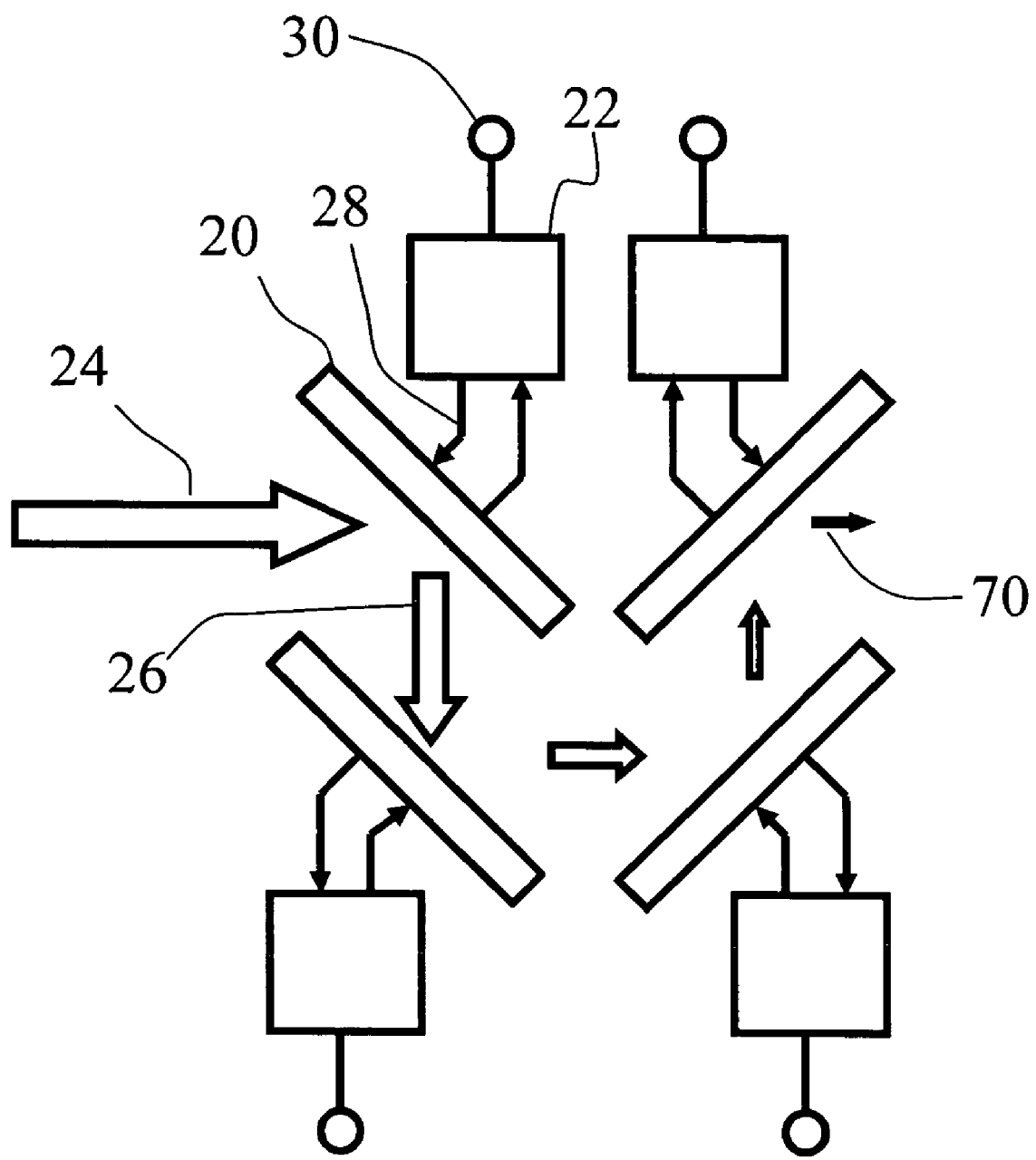
FIG. 9 shows a trap detector containing several pyroelectric detectors each with electrical power feedback.

The electrical power that is measured is equal to the amount of radiation absorbed. It was previously noted that amount of radiation that is reflected must be known to make a calibrated radiation measurement. FIG. 9 shows several detectors, each with a power feedback amplifier. The detectors are arranged such that the radiation that is specularly reflected from the first is directed onto the second, from the second to the third, and from the third to the fourth. Such an arrangement can compensate for the fact that not all the radiation is absorbed by the first detector. With a sufficient number of detectors, the amount of radiation that escapes 68 can be negligible. The number of detectors required depends on the reflectance of the detectors and the accuracy required for the measurement. A single detector and a single mirror to redirect reflected radiation onto the detector can lead to sufficiently accurate results for some applications. Highly reflective mirror surfaces can be added to the structure to redirect radiation, which would otherwise escape, back onto the detectors. A cavity structure with all the walls being detectors and very little space between the detectors is another alternative. With multiple detector arrays better than 99% of the radiation can be absorbed. With sufficient absorption of the radiation, the reflectance measurement becomes unnecessary, and it is not necessary to know the polarization state of the radiation. The total radiation power is the sum of the electrical powers applied to each detector.

The use of arrays of HiFi ECPR's to achieve high absorption is now practical because the electronics is greatly simplified over prior art ECPR's. An array of detectors with their feedback amplifiers can be substituted for the single detector feedback amplifiers in both FIG. 7 and FIG. 8. The HiFi ECPR's are faster, exhibit greater uniformity, and are more sensitive to low power levels, compared to other practical, electrically calibrated thermal detectors. The accuracy that was previously achieved with silicon diode trap detectors, which operated over limited wavelengths and limited power levels, can now be achieved with HiFi ECPR's. The HiFi ECPR can cover much greater wavelength ranges and measure much greater power levels than the silicon trap detectors. In contrast to the silicon trap, with the HiFi ECPR trap there is no need to the source wavelength to determine the radiation power.

I claim:

1. A method for modifying the response of a pyroelectric detector to incident electromagnetic radiation such that the response will reproduce with improved fidelity the waveform of incident radiation, said method comprising the following acts of:
   (a) applying a bias level of electrical power to the detector to increase its temperature above a reference temperature;
   (b) amplifying the signal power from the detector due to changes in temperature of the pyroelectric, and
   (c) directly applying said amplified signal from the detector to modify the electrical power applied to the detector such that the rate of change of the detector temperature, which would be caused by incident radiation alone, is reduced.

2. An apparatus for measuring electromagnetic radiation, said apparatus comprising:
   (a) a pyroelectric detector;
   (b) an electrical heater in contact with the pyroelectric detector;
   (c) an electronic circuit to apply a bias power to the electrical heater to raise the detector temperature;
   (d) an amplifier that amplifies a signal from the detector;
   (e) a circuit that feeds the amplified signal power to the electrical heater to reduce the rate of change of the detector temperature that would be caused by the absorbed radiation without the feedback, and
   (f) output ports for reading detector voltages.

3. An apparatus as set forth in claim 2 further comprising a device for measuring the electrical power applied to the heater to obtain a calibrated response.

4. An apparatus as set forth in claim 2 further comprising an electrical switch that will allow the system to operate with or without bias power.

5. An apparatus as set forth in claim 2 further comprising an electrical switch that will allow the system to operate with or without feedback.

6. An apparatus as set forth in claim 2 further comprising:
   (a) an electrical switch that will allow the system to operate with or without bias power, and
   (b) an electrical switch that will allow the system to operate with or without feedback.

7. An apparatus as set forth in claim 6 further comprising a device for controlling of the feedback switch such that, after turning on the bias, the feedback is held off until the detector has reached a temperature such that when the feedback circuit is activated it will be effective in reducing the rate of change of temperature.

8. An apparatus as set forth in claim 2 further comprising a device to block and pass the radiation incident radiation.

9. An apparatus as set forth in claim 2 further comprising a signal processing and control system to display the measurement results.

10. An apparatus as set forth in claim 2 further comprising a temperature module to account for changes in the reference temperature.

11. An apparatus for measuring electromagnetic radiation, said apparatus comprising:
   (a) more than one pyroelectric detector;
   (b) an electrical heater in contact with each pyroelectric detector;
   (c) an electronic circuit to apply a bias power to each electrical heater to raise each detectors temperature;
   (d) amplifiers that amplify the signal from each detector;
   (e) circuits that feed the amplified signal power to the electrical heaters to reduce the rate of change of each detector temperature that would be caused by the absorbed radiation without the feedback, and
   (f) output ports for reading the signals.

* * * * *